(12) United States Patent
Radenbaugh et al.

(10) Patent No.: US 12,037,817 B2
(45) Date of Patent: Jul. 16, 2024

(54) BICYCLE SECURITY DEVICES AND SYSTEM

(71) Applicant: Rad Power Bikes Inc., Seattle, WA (US)

(72) Inventors: Mike Radenbaugh, Seattle, WA (US); Redwood Stephens, Seattle, WA (US)

(73) Assignee: Rad Power Bikes Inc., Seattle, WA (US)

( * ) Notice: Subject to any disclaimer, the term of this patent is extended or adjusted under 35 U.S.C. 154(b) by 90 days.

(21) Appl. No.: 16/875,874

(22) Filed: May 15, 2020

(65) Prior Publication Data

US 2020/0361552 A1    Nov. 19, 2020

Related U.S. Application Data

(60) Provisional application No. 62/848,116, filed on May 15, 2019.

(51) Int. Cl.
| | |
|---|---|
| *E05B 71/00* | (2006.01) |
| *B62H 5/00* | (2006.01) |
| *B62H 5/14* | (2006.01) |
| *E05B 15/16* | (2006.01) |
| *E05B 67/00* | (2006.01) |

(Continued)

(52) U.S. Cl.
CPC ............. *E05B 71/00* (2013.01); *B62H 5/003* (2013.01); *B62H 5/147* (2013.01); *E05B 15/1614* (2013.01); *E05B 67/006* (2013.01); *E05B 73/0011* (2013.01); *B62M 6/40* (2013.01)

(58) Field of Classification Search
CPC ............. E05B 15/1614; E05B 15/1621; E05B 15/1635; E05B 15/165; E05B 15/1692; E05B 67/003; E05B 67/006; E05B 67/28; E05B 71/00; E05B 73/00; E05B 73/0005; E05B 73/0011; B62H 5/00; B62H 5/003; B62H 5/14; B62H 5/142; B62H 5/147; B62M 6/40
See application file for complete search history.

(56) References Cited

U.S. PATENT DOCUMENTS 3,965,709 A * 6/1976 Belke ..................... B62H 5/147
                                                              70/227
4,033,160 A * 7/1977 Mima .................... B62H 5/003
                                                              70/227

(Continued)

OTHER PUBLICATIONS www.mobil.abus.com/int/on-road/Locks/Frame-Locks/ADAPTOR-CHAIN-ACH-6KS-85-BK?type=pdp (2020).

(Continued)

*Primary Examiner* — Christopher J Boswell
(74) *Attorney, Agent, or Firm* — AMPACC Law Group, PLLC

(57) ABSTRACT

A bicycle security device and associated bicycle theft alert or security systems are described. In some embodiments, the security devices and systems are configured to deter theft or other unauthorized uses of a bicycle, such as an electric bicycle, by providing multiple points or mechanisms of protection for the bicycle. For example, a bicycle security device, or bike lock, can include a cable or tether component integrated with a shackle of a wheel lock mechanism, which enables a rider to secure his/her bicycle via two integrated mechanisms of deterrence or protection within the bike lock.

10 Claims, 12 Drawing Sheets

(51) Int. Cl.
*E05B 73/00* (2006.01)
*B62M 6/40* (2010.01)

(56) References Cited

U.S. PATENT DOCUMENTS

| | | | | |
|---|---|---|---|---|
| 5,197,310 | A * | 3/1993 | Pedersen | B62H 5/147 70/227 |
| 5,408,212 | A * | 4/1995 | Meyers | E05B 45/005 340/432 |
| 5,513,508 | A * | 5/1996 | Saunders | E05B 73/0011 70/30 |
| 6,505,846 | B1 * | 1/2003 | Hoffman | B62H 5/003 280/274 |
| 9,512,649 | B2 * | 12/2016 | Mohamed | E05B 47/0012 |
| 9,580,936 | B2 * | 2/2017 | Poehlmann | E05B 73/0011 |
| 10,220,899 | B2 * | 3/2019 | Yang | E05B 47/06 |
| 10,407,116 | B2 * | 9/2019 | Mohamed | B62H 5/147 |
| 10,937,086 | B2 * | 3/2021 | Guo | B62J 45/41 |
| 11,066,117 | B2 * | 7/2021 | Hu | B62H 5/00 |
| 2014/0352369 | A1 * | 12/2014 | Dasbach | B62H 5/147 70/15 |
| 2018/0118294 | A1 * | 5/2018 | Anuth | B62H 5/003 |
| 2019/0368223 | A1 * | 12/2019 | Liu | B62H 5/147 |

OTHER PUBLICATIONS

"8 Smart Bike Locks for Daily Commuters", Gadget Flow, www.medium.com/the-gadget-flow/8-smart-bike-locks-for-daily-commuters-27a9f9dfda4f (Aug. 7, 2017).

* cited by examiner

BICYCLE SECURITY DEVICES AND SYSTEM

CROSS REFERENCE TO RELATED APPLICATIONS

This application claims priority to U.S. Provisional Patent Application No. 62/848,116, filed on May 15, 2019, entitled BICYCLE SECURITY DEVICES AND SYSTEM, which is hereby incorporated by reference in its entirety.

BACKGROUND

Electric bicycles, or e-bikes, are a popular method of transportation for use by individual riders, families, commercial enterprises, and so on. Generally, electric bicycles are more expensive than traditional bicycles, and thus enhanced security devices and anti-theft systems that assist with or prevent unauthorized and/or unwanted use of an electric bicycle, such as its theft, are desirable.

While conventional security devices, such as locks (e.g., cables, chains, D-locks U-locks, wheel locks) or alert systems, can provide varying levels of deterrence or prevention, thieves can still find ways to remove the locks or avoid the alert systems. For example, thieves have a myriad amount of lock removal tools at their disposal, such as lock picks, cable cutters, hacksaws, bolt cutters, drills, grinders, and so on. Further, conventional alert systems can be expensive and/or suffer from presenting false alerts or not detecting the theft of a bicycle until it is too late (e.g., once the thief has already removed the lock and is riding away with the bike).

These and other drawbacks exist with respect to conventional locks and alert systems.

BRIEF DESCRIPTION OF THE DRAWINGS

Embodiments of the present technology will be described and explained through the use of the accompanying drawings.

Figure 1A:
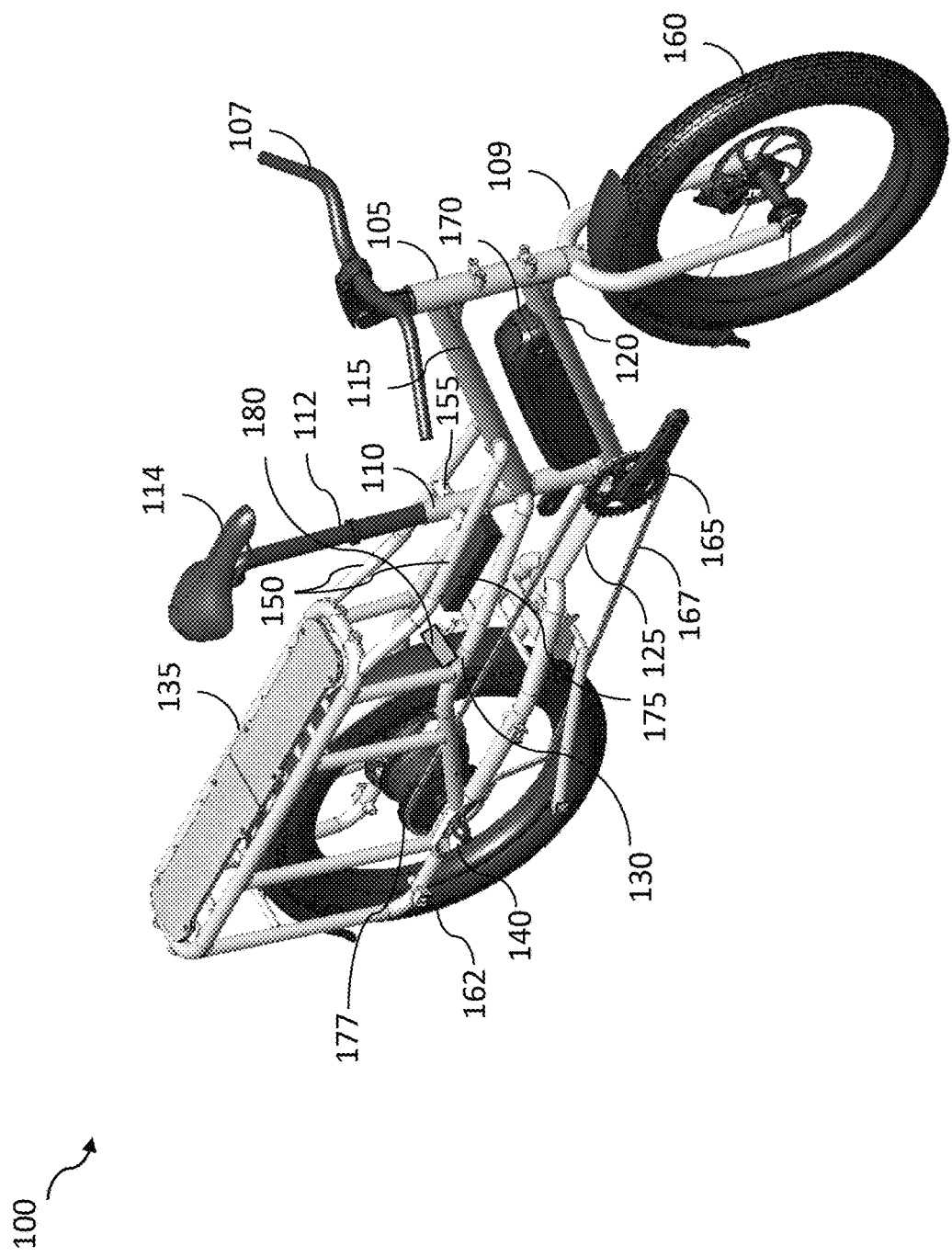
FIG. 1A is an isometric view of an electric bicycle.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

A bicycle security device and associated bicycle theft alert or security systems are described. In some embodiments, the security devices and systems are configured to deter theft or other unauthorized uses of a bicycle, such as an electric bicycle, by providing multiple points or mechanisms of protection of and for the bicycle.

For example, a bicycle security device, or bike lock, can include a cable or tether component integrated with a shackle component of a wheel lock, which enables a rider to secure his/her bicycle via two integrated mechanisms of deterrence or protection within the bike lock.

Further, the security systems described herein utilize information associated with the operation of the security devices when causing theft alarms or other alerts to be triggered due to unauthorized activities associated with an electric bicycle. For example, the security systems can prevent the theft of a bicycle, or prevent false alarms resulting from normal activities, by triggering alarms based on information received from a bike lock and/or in combination with other sensors.

While described herein with respect to an electric bicycle, in some embodiments aspects of the security devices and systems described herein can be configured or utilized with other bicycles or cycles, such as non-electric bicycles, tricycles, scooters or other wheeled micro-mobility vehicles, mopeds, and so on.

Various embodiments of the security devices and systems will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of Security Systems and an Electric Bicycle

FIG. 1A depicts an electric bicycle 100 that incorporates many of the various features of the technology described herein. As depicted, the electric bicycle, or e-bike, is a long-tail cargo bike configured to be propelled either by human pedaling of the e-bike and/or via an electric motor that assists the human's pedal-power or propels the e-bike without pedaling (similar to a moped or scooter).

The electric bicycle 100 includes a head tube 105 that incorporates a front fork 109 and handlebars 107. A top tube 115 connects the head tube 105 to a seat tube 110, which is substantially parallel to the head tube 105. A down tube 120, parallel to the top tube 115, also connects the head tube 105 to the seat tube 110 at a bottom portion of the seat tube 110. A seat or saddle post 112 is positioned partially in the seat tube 110 and extends or protrudes outwardly from the seat tube 110. The seat post 112 supports a seat or saddle 114, upon which a rider sits on the bicycle 100.

Two chainstays 125 (or one chainstay with two arms) extend from the bottom portion of the seat tube 110 and each end at a dropout assembly 140 (or dropout or forkend) of the bike frame. Two seatstays 130 extend from a middle portion of the seat tube 110 (an area where the top tube 115 attaches to the seat tube 110) to the dropouts 140.

A rear rack 135 is positioned in the rear of the electric bicycle 100. The rear rack includes various support tubes or posts and is at least partially connected to and supported by the seatstays 130 and the dropouts 140. Two cross members 150, or support stays, attach to the rear rack 135 and extend to the top tube 115. The cross members 150 extend around the seat tube 110, forming a space or opening defined by the cross members 150, the seat tube 110, and the top tube 115. Thus, in some embodiments, the supports, such as the cross members, provide fore/aft and/or lateral stabilization for the frame.

The electric bicycle 100 also includes components common to bicycles, such as a front wheel 160 and rear wheel 162 that support the frame of the bicycle 100, a crankset 165 (that supports pedals, not shown), and a chain 167 that extends from the crankset to a rear axle of the rear wheel 162.

The electric bicycle 100 also includes a battery pack 170 positioned and/or mounted to the down tube 120, a controller 175 mounted to the seatstays 130, and an electric motor 177 mounted to the rear wheel. During operation of the electric bicycle 100, the battery pack 170 provides power to the electric motor 177, which propels the bicycle under control of the controller 175.

Further, the electric bicycle 100 includes an integrated security device 180, as described herein. The integrated security device 180 can include both a cable or tether lock component integrated with a wheel lock (having a sliding or rotating shackle), which enables a rider to secure his/her bicycle via two integrated mechanisms of deterrence or protection housed within the bike lock. Further details regarding the integrated security device 180, or lock, are described herein.

In addition to the components depicted in FIG. 1A, the electric bicycle can include other components not shown, such as pedals, brakes and braking systems, various accessories, fenders, various types of rims, tires, or wheels, locking or security systems, lights and reflectors, bells or other audible alert systems, GPS, screens, and/or other user interfaces or display devices, and so on.

As described herein, in some embodiments, the electric bicycle 100 includes various communication components, such as components configured to trigger alerts and/or alarms associated with unauthorized movement or use of the bicycle 100, as well as component configured to perform other communication functions.

Figure 1B:
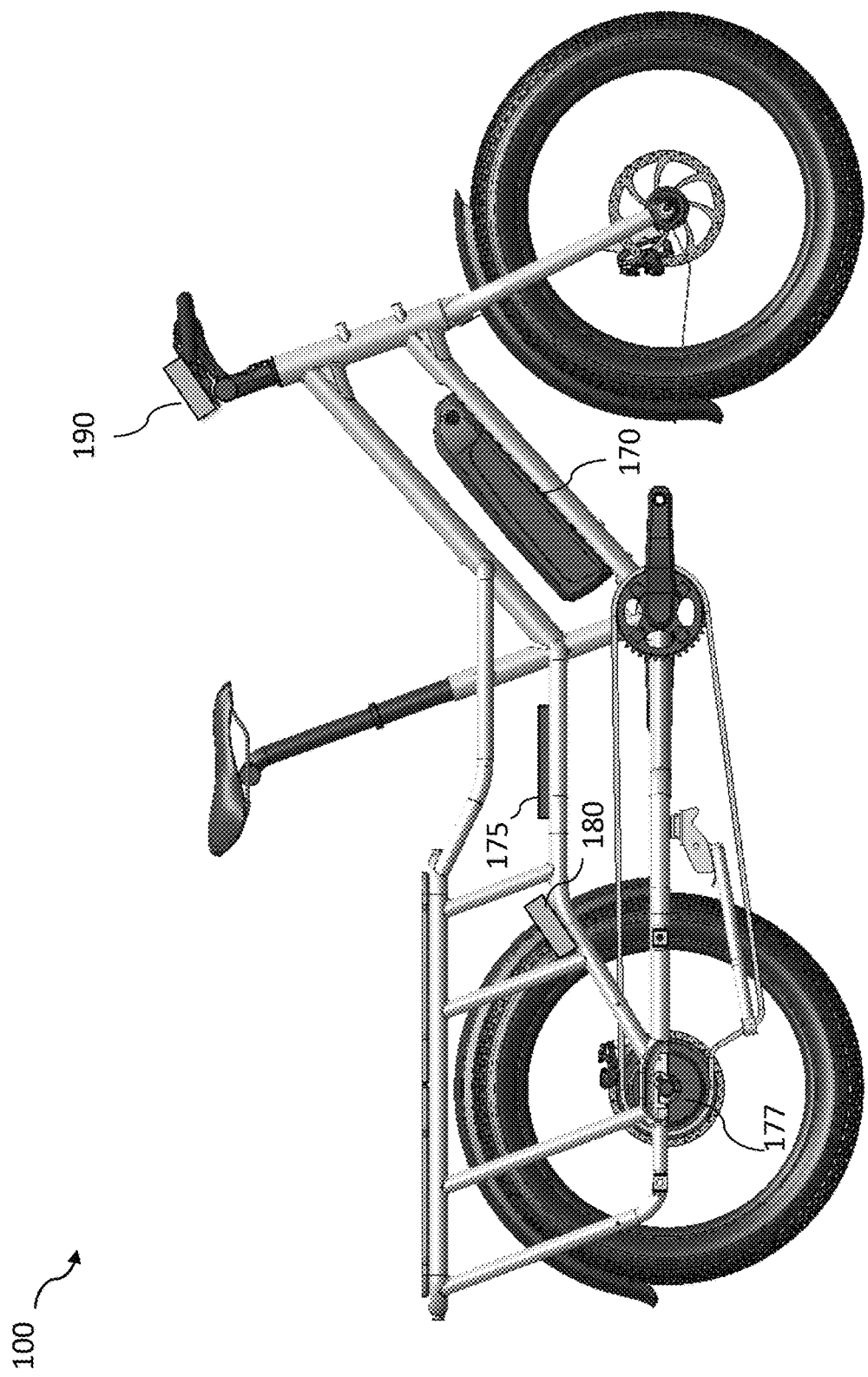
FIG. 1B is a side view of the electric bicycle and associated communication devices.

FIG. 1B depicts the communication devices of the electric bicycle 100. As described herein, the electric bicycle 100 includes a control device or controller 175 that controls functions of the electric battery 170 and hub motor 177. The controller can also communicate with a display device 190, which can present information to riders, as well as receive input from riders of the bicycle 100. The controller 175 can also communicate with the integrated security device 180, which can include various components configured to interact with the controller 175, the display device 190, the battery 170, and/or a network, such as a cellular network.

In some cases, the integrated security device 180 can be a combination of a physical lock and attached communication module, such as a retrofitted module that attaches to the physical lock and provides communication functionality for the lock. The module can communicate with the other devices over short or near-field communication channels, such as via Bluetooth, or may communicate over a network. Thus, in these cases, the module physically interacts with the lock to detect abnormal behaviors of the lock (e.g., damage to a component of the lock during a theft attempt), while interacting with other components of the bicycle via Bluetooth (e.g., to alert the controller 175, the display device 190, and/or a remote server of an abnormal event at the lock).

Figure 2:
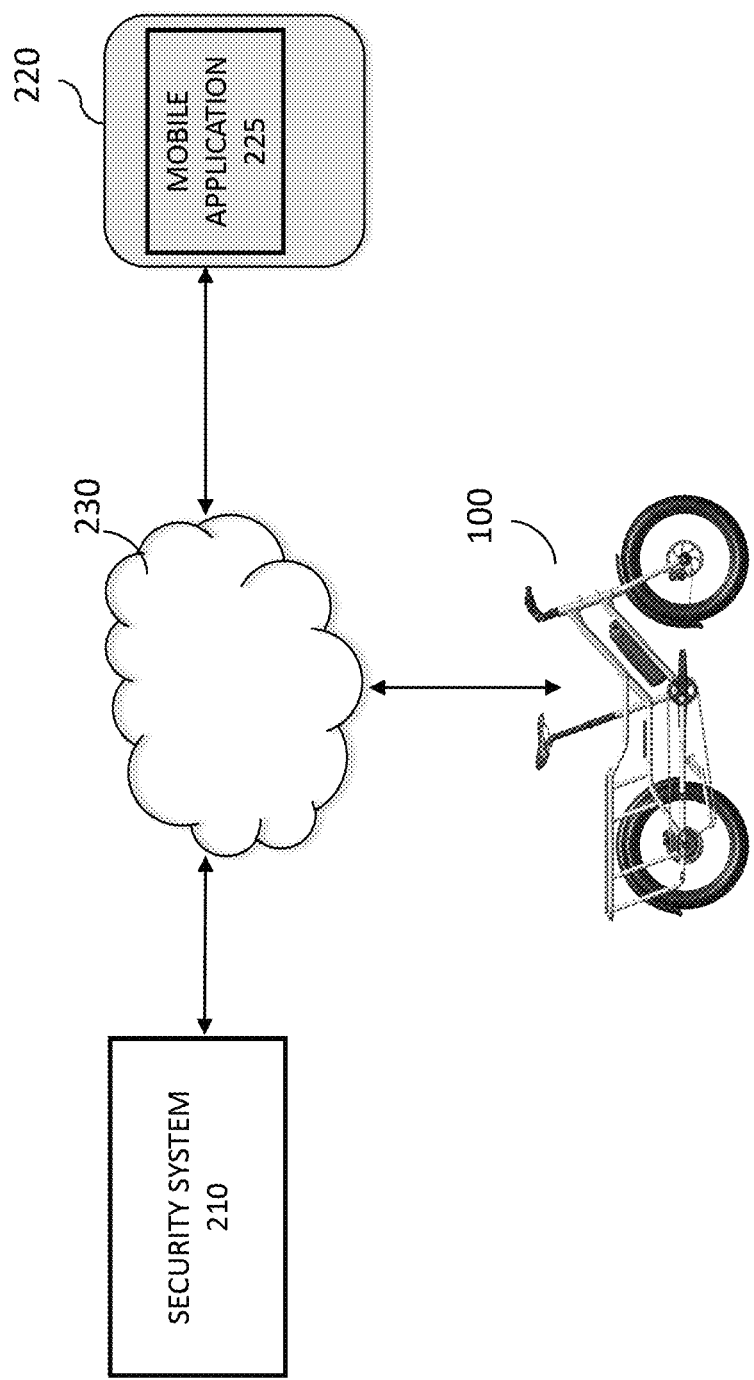
FIG. 2 is a block diagram illustrating a suitable communication network environment for an electric bicycle.
Figure 3:
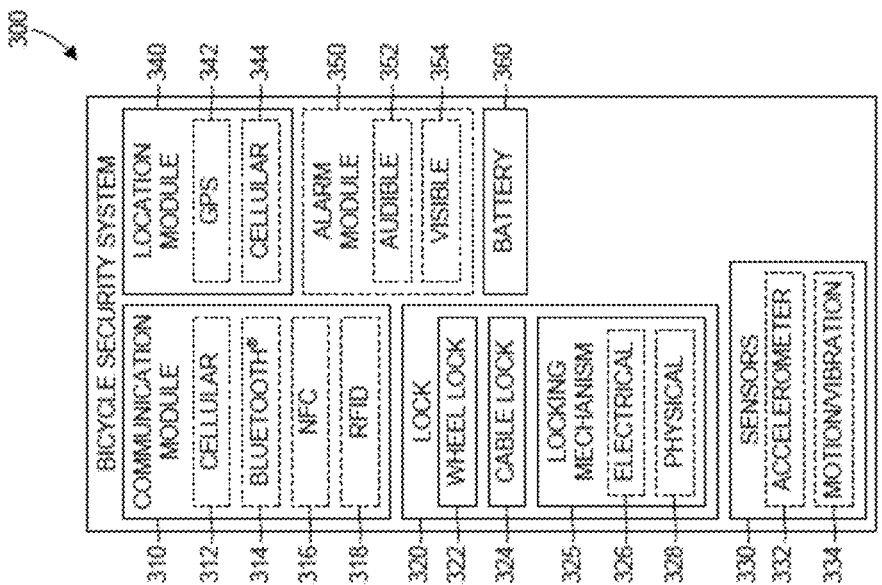
FIG. 3 is a block diagram illustrating example components of a bicycle security system.

FIG. 2 is a block diagram illustrating a suitable communication network environment 200. The bicycle 100, as described herein, can send information to, and receive information from, other devices over a communications network 230, such as a security server 210, a mobile device 220 having a mobile application 225 associated with the bicycle 100, and so on. Thus, the bicycle 100, via the various communication devices, can act as an IoT device or other communication device on the network FIG. 3 is a block diagram illustrating example components of a bicycle security system 300 configured to assist with preventing the unauthorized/unwanted use and/or movement of a bicycle, such as the electric bicycle 100. The security system 300 can include a communication module 310, a lock 320, sensors 330, a location module 340, an alarm module 350 and/or a battery 360. The various modules, device and/or systems of the security device 300 can assist with securing the bicycle and/or monitoring movement of the bicycle 100.

The communication module 310 provides a communication capability to the security system 300. The communication module 310 can provide one or more communication methods, protocols, systems and/or devices, such as cellular communication 312, Bluetooth® communication 314, Near-Field Communication (NFC) 316, Radio Frequency Identification (RFID) communication 318 and/or other communication capability(s). Various data and/or signals can be transmitted to and/or from the security system 300 using the communication module 310. Example communications can include location/tracking data for the bicycle to which the security system 300 is affixed, lock/unlock command(s) for the lock 320, and/or other data and/or signals.

The example cellular communication 312 can be a continuous and/or periodic connection to a cellular, or other, network to allow the transmission of communications to/from the bicycle security system 300. The other communications, such as 314, 316, and 318, may have a reduced operating range that makes them more suitable for communication with objects, devices and/or systems that are within a proximity of the security system 300.

In some embodiments, the short-range communication(s), such as 314, 316, and 318, can be used to indicate to the security system 300 an authorized user of the bicycle, such as by use of a proximity card/fob, a signal from a mobile device, and/or other communication/signal. In response to the received authorized user communication, the security system 300 can perform one or more functions to allow the authorized use of the bicycle, such as the disengagement of the lock 320.

The lock 320 can include a wheel lock 322 and/or a cable lock 324 that can be used to secure the bicycle to which the security system 300 is affixed. In an embodiment, the wheel lock 322 and the cable lock 324 can be used individually or in conjunction with each other to secure the bicycle. In another embodiment, the wheel lock 322 can be used separately from the cable lock 324, however, the cable lock 324 can require the use of the wheel lock 322 to secure the cable lock 324. That is, to secure a free end of the cable lock 324 to the security system 300, a shackle of the wheel lock 322 can be required to be in the closed/secured position.

A single, or multiple, locking mechanism(s) 325 is included and can control the engagement of one or both of the wheel lock 322 and/or the cable lock 324 to allow the bicycle to be secured and/or used. The locking mechanism 325 can be actuated using an electrical 326 or physical 328 key. The electrical key 326 can include a communication and/or signal received by the security system 300, such as by the communication module 310, from an external source that confirms the authorization of a user to actuate the lock 320.

In an example, the electrical key 326 can be included in a proximity card/fob that a user can place on or near the security device 300 to cause a communication that causes the lock 320 to be actuated. Similarly, the physical key 328 can be used to physically actuate the lock 320 for use or securement of the bicycle by a user.

One or more sensors 330 can be included in the security system 300 and/or on/in the bicycle to which the security system 300 is affixed/mounted. Example sensors 330 can include an accelerometer 332 and/or motion/vibration sensor 334. The sensors 330 can monitor various parameters of the bicycle, such as a speed, orientation, status, etc., and changes therein. For example, the sensors 330 can monitor the state or orientation of the bicycle and can register a change in the state/orientation, such as might be caused by the bicycle falling over or colliding with an object. In response to registering such a change (which can be considered over a period of time) by the sensors 330, the security system 300 can cause an alert to be generated. The alert can be local, such as output through by alarm module 360, or can be communicated to a remote device/location, such as by the communication module 310.

In an example embodiment, a user using the bicycle may collide with, or be collided into by, a vehicle. The sensors 330 can sense the change in the speed and/or orientation of the bicycle and generate a signal/notification in response to the change. The signal/notification can be transmitted by the communication module 310 to a remote device/location, such as a monitoring center, emergency services, a user, a user's contact and/or other person, location, device and/or system. In another example embodiment, the sensors 330 can sense motion of the bicycle, and if the motion is determined to have occurred, or is occurring, during a period in which use of the bicycle is not authorized to be used, the security system 300 can transmit a local and/or remote alert/notification indicating an unauthorized movement of the bicycle.

The location module 340 can determine a geographical location, and/or other movement/location information, of the bicycle to which the security system 300 is affixed/attached. The location module 340 can include a global position system (GPS) sensor/system 342 and/or a cellular sensor/system 344 that can be used to determine a location of bicycle. The GPS 342 uses signals received from one or more satellites and the cellular 344 uses cellular signals/locations to determine a position/location of the bicycle. The location can be monitored over a period of time, allowing the movement of the bicycle to be tracked, and/or the location can be monitored in substantially real-time to provide a current location of the bicycle. In an example embodiment, the cellular device/system 344 of the location module 340 can be the cellular device/system 312 of the communication module 310. The location information of the security system 300 can be transmitted to one or more remote locations, devices and/or systems, and/or can be stored locally in the security system 300. The transmission of the location information can be at regular/fixed and/or variable intervals.

In an example embodiment, the detection of motion by the sensors 330 can cause the location module 340 to initiate and/or increase the rate at which the position of the bicycle is recorded and/or provided to an external device/system. This can allow more accurate, and/or timely, tracking of the bicycle while it is in motion. Additionally, the location information of the location module 340 can be compared to predetermined/preset location limits to determine if the bicycle is operating, or located, outside of an authorized area.

The alarm module 350 of the security system 300 can include one or more audible 352 or visible alarms 354. The alarm module 350 can be activated to output an alarm based on various information/data, such as from the sensors 330, the location module 340, and/or from other sources and/or based on other inputs. Example audible alarms 352 can include a speaker, siren, annunciator, or other sound output device. The sound output by the audible alarm 352 can be a constant or varying sound, and may vary in frequency, pitch, loudness, and/or other characteristic(s) of the output sound. Example visible alarms 354 can include one or more lights that can be constant and/or varying in their output. One or more of the audible 352 or visible alarms 354 can be activated in response to a conditional state change of the bicycle to which the security system 300 is attached/affixed.

In an example embodiment, the sensors 330 can detect/sense movement of the bicycle while in a locked/unauthorized state, and in response, the alarm module 350 can be activated to output an alarm indicating the unauthorized use/movement of the bicycle. In another example embodiment, the location module 340 can determine a location of the bicycle, and if the bicycle is located outside of a preset, or authorized, operating area, the alarm module 350 can be activated to provide an indication that the bicycle is violating one or more operating parameters.

The battery 360 can provide power to the various components, devices and/or systems of the security system 300. While not in use, the battery 360 can allow the various modules of the security system 300 to continue to operate, such as to communicate a location of the bicycle and/or monitor the state of the bicycle. The battery 360 can be rechargeable and can be charged from an external source, while the bicycle is being used, such as by a generator/alternator coupled to the drivetrain of the bicycle, is being charged, such as in the case of an electric bicycle, and/or from/by another source. Alternatively, or additionally, the battery 360 can be replaced, such as when needed and/or in response to an insufficient level of charge to provide the requisite power to the security system 300. In another embodiment, the security system 300 can be coupled to and draw power directly from a main battery of an electric bicycle, and/or the battery 360 of the security system 300 can be recharged from the main battery of the electric bicycle.

Figure 4:
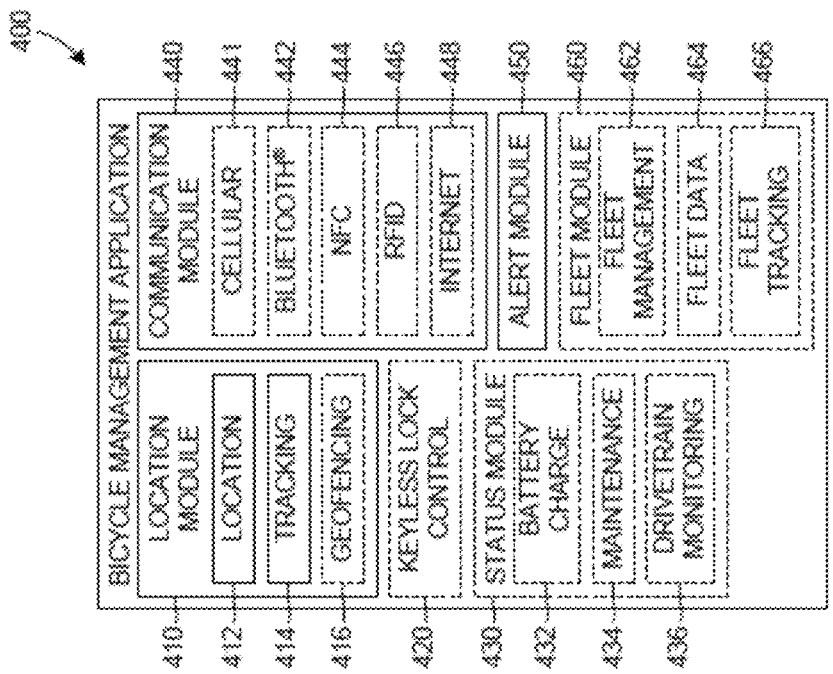
FIG. 4 is a block diagram illustrating example components of a bicycle management application.

FIG. 4 is a block diagram illustrating example components of a bicycle management application 400. The management application can be application 225, supported by mobile device 220. The management application 400 allows one or more users to interact with one or more bicycles that are accessible via the application 400. For example, a user can install the management application 400 on a mobile device to allow them to track, monitor, secure, and/or access their bicycle, including a security system such as 300 of FIG. 3, via the application 400. In another example, a user may use the management application 400 to access a fleet of one or more bicycle available for the user to use. The user can use the application 400 to locate a bicycle and provide the necessary authorization for the user to use the bicycle.

In other examples, a manager of a fleet of bicycles can use the management application 400 to control various operating and/or use parameters of the fleet of bicycle, or a subset thereof. The management application 400 can be a single application that has various permission levels and/or capabilities based on the user, or can be one or more separate/distinct applications that are based on one or more types of users.

A location module 410 can be includes in the management application 400. The location module 410 can show the position/location 412 of a bicycle and/or can track 414 the movement of the bicycle. The bicycle can be equipped with a locating device, such as the security system 300 of FIG. 3, which determines and transmits the location of the bicycle.

The transmitted location data can be logged to track the bicycle and/or can be displayed to show a current location of the bicycle. The location 412 and/or the tracking data 414 can be displayed on a map to assist the user in visualizing the location and/or track of the bicycle. Additionally, the location module 410 can include a geofencing 416 capability. The geofencing 416 can allow a user, or other, to set a perimeter or operating area associated with one or more bicycles accessible/manageable by the management application 400. The received location data of the bicycle can be compared to the geofence 416 and an alert or notification can be generated in response to the location 412 of the bicycle violating the geofencing 416. In an example embodiment, the violation of the geofencing 416 can cause a signal/command to be transmitted to the offending bicycle to disable or impede the functionality of the bicycle.

Keyless lock control 420 can be included as part of the management application 400. The keyless lock control 420 can be accessed by the user to transmit a command or signal to a bicycle to authorize it for use and/or to secure the bicycle. The transmitted command or signal can be via a communication module 440 and can be a short range, long range and/or network facilitated transmission from the management application 400 to a bicycle.

A status module 430 of the management application 400 can monitor and/or store data regarding various statuses, parameters and/or other data/information regarding one or more bicycles accessible via the management application 400. For example, the status module 430 can track a battery charge 432 of an electric bicycle, the maintenance 434 regarding a bicycle, monitor the drivetrain of a bicycle 436, and/or other information/data regarding the status, such as an operational status, of one or more bicycles. A user can access and assess the information to assist in determining various maintenance and/or operational needs of the one or more bicycles. In an example, a user can view the status of a nonoperational bicycle to determine what is needed to make the bicycle operational once again.

The communication module 440 of the management application 400 can assist with transmitting and/or receiving various communications from one or more bicycle and/or other external resources, devices, and/or systems. The communication module 440 can utilize the communication hardware of the device on which the management application 400 resides to provide the communication capability(s). The device can include one or more communication capabilities, such as cellular 441, Bluetooth® 442, NFC 444, RFID 446, internet 448 and/or other communication capabilities. In an example, location information from a bicycle can be received by the communication module 440 for use by the location module 410. Additionally, the keyless lock control 420 commands/signals can be transmitted by the communication module 440 to a bicycle to authorize the use of and/or to secure the bicycle.

An alert module 450 can provide alerts and/or notifications to one or more users of the management application 400. The alerts/notifications can be caused by various data/information received by the management application 400 and/or can alert/notify a user of various data/information. In an example, the alert module 450 can output, display, or caused to be displayed, an alert regarding a bicycle violating a geofence 416. Other example alerts/notifications can include an alert that a bicycle has collided or fallen, an alert that a status of a bicycle is outside of a limit, such as a low battery charge level, and/or other alerts/notifications.

A fleet module 460 can be included in the management application 400 to allow a user to view data regarding and/or manage/evaluate a fleet of one or more bicycles. The fleet module 460 can include a fleet management capability 462, data regarding the fleet 464, tracking of the individual bicycles of the fleet 466 and/or other fleet capabilities. The fleet management 462 can allow a user to provide rules/commands to the fleet as a whole, such as establishing a geofence 416, securing the fleet of bicycles and/or other fleet operational commands/rules. Additionally, the fleet management 462 can allow the user to add and/or remove bicycles from a particular, fleet. In an example, the user can add a particular bicycle by entering an identification of the bicycle, such as by scanning a QR code.

The fleet module 460 can allow the user to cycle through one or more fleets the user has access to, and the user can manage/evaluate the fleets individually or as a whole, or subset thereof. The fleet data 464 can provide data regarding the fleet as a whole and/or data regarding the individual bicycles of the fleet, such as status information of the fleet and/or a particular bicycle of the fleet. Fleet tracking 466 can provide data regarding current and/or historical locations of the bicycles of the fleet. The fleet tracking 466 data can be visualized on a map, and/or other display, such as a chart or table.

Figure 5:
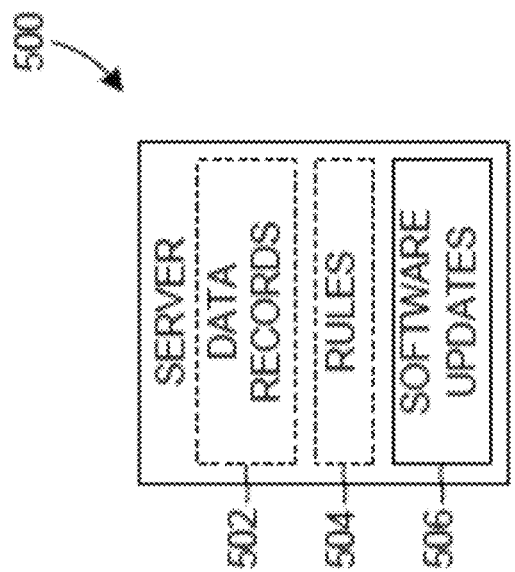
FIG. 5 is a block diagram illustrating example components of a security server.

FIG. 5 is a block diagram illustrating example components of a security server that can communicate with one or more management applications, such as the applications described herein. The server 500 can receive data from one or more of the management applications and the security system 300 and can store, process and/or provide such data to each and/or another device/system. Additionally, the server 500 can assist with communications between a security system and a management application associated therewith. The server 500 can include data records 502, rules 504, software updates 506 and/or other information, data and/or capabilities.

The data records 502 can include various data/information received from the one or more security systems and/or one or more management applications. This data can be stored, retrieved and/or processed as needed. The rules 504 can include various rules that can be applied to the security device(s) and/or management application(s), such as operational rules and/or permissions, on a global/overarching level. In an example, a manufacturer/operator of a bicycle, security system and/or management application can manage the server 500 and can use the rules 504 functionality to apply rules/limits to a bicycle, security system and/or management application that are not changeable by a user.

The software updates 506 can include updates to software associated with one a bicycle, a security system and/or a management application. Updates can be transmitted/communicated from the server 500 to the bicycle, security system and/or management application and installed thereon to update the software of the bicycle, security system and/or management application. In an example embodiment, the software updates 506 can be transmitted over a cellular network, such as network 230, to the bicycle, security system and/or management application.

FIGS. 2-5, and the components depicted herein, provide a general computing environment and network within which the bicycle security systems and methods can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The network or cloud 230 can be any network, ranging from a wired or wireless local area network (LAN), to a wired or wireless wide area network (WAN), to the Internet or some other public or private network. While the connections between the various devices and the network 230 and are shown as separate connections, these connections can be any kind of local, wide area, wired, or wireless network, public or private.

Further, any or all components depicted in the Figures described herein can be supported and/or implemented via one or more computing systems or servers. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, AR/VR devices, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system may reside on a server computer, while corresponding portions may reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Examples of Integrated Security Devices

Figure 6B:
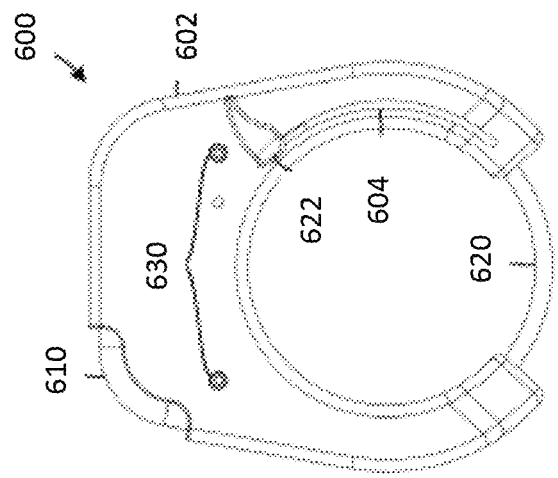
FIGS. 6A-6B illustrate an example bicycle security device.
Figure 6A:
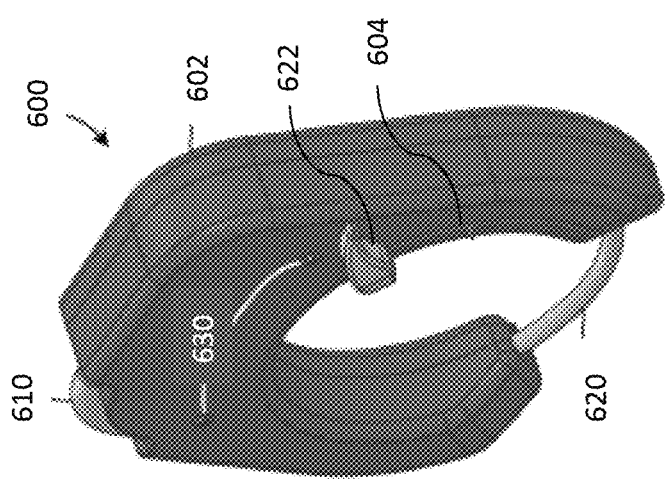

As described herein, the electric bicycle 100 includes an integrated, multi-function, and/or multi-lock security device 180, such as a lock having both a cable lock and a wheel lock. FIGS. 6A-6B illustrate an example bicycle security device 600 having integrated security devices. The security device 600, which can be security device 180, can be mounted securely to the frame of the bicycle 100. In such a position, the device 600 engages the real wheel to prevent rotation of the wheel. By preventing the wheel from rotating, the security device 600 assists in preventing the unapproved/unauthorized use of the bicycle, such as a theft of the bicycle 100. To prevent the rotation of the wheel, the security device 600 includes a shackle that passes between the spokes of the wheel, preventing the spokes from moving, or passing, by the security device 600, which prevents rotation of the wheel.

The security device 600 can be locked, preventing rotation of the wheel, or unlocked, to allow the wheel to rotate freely, using a physical or electronic key. To lock/unlock the security device 600, a user can use a physical key to allow the shackle to be freely moved or secured in a position. Also, an electronic key, such as a proximity device, communicated signal/command, or other electronic key as described herein, can be used to engage and/or disengage the shackle of the security device 600.

To attach, or affix, the security device 600 to the bicycle 100, security screws and/or other secure mounting hardware can be used. The security screws and/or secure mounting hardware can prevent, or assist in preventing, the unauthorized, unwanted, tampering and/or removal of the security device 600 from the bicycle 100.

As shown in FIGS. 6A-6B, the security device 600 includes a cable lock 610 (or tether) and a shackle 620 that can be used in combination to secure a bicycle to which the security device 600 is affixed. In combination, the cable lock 610 can be used to secure the bicycle to another object, such as a bike rack or post, and the shackle 620 can be used to prevent rotation of a wheel of the bicycle 100, such as the rear wheel, which can prevent, or increase a difficulty of, moving of the bicycle 100.

The security device 600 includes a housing 602 that contains the locking mechanism for the cable lock 610 and the shackle 620. A single locking mechanism can be used to control the locking of both the cable lock 610 and the shackle 620, or separate locking mechanisms can be used to control the locking of each locking device. The locking mechanism(s) can be controlled using a physical key and/or electronic key, such as a proximity card/fob, a transmitted electronic command/code, or other electronic key. The user can use the key, physical or electronic, to lock/unlock one or both the cable lock 610 and the shackle 620.

Openings 630 are included in the housing 602 of the security device 600. The openings 630 allows security screws, or other securing/attachment hardware/systems, to pass through and secure the security device 600 to a bicycle. Using security, or tamper resistant, hardware to attach the security device 600 to the bicycle assists in preventing the unauthorized, or unwanted, removal of the security device 600 from the bicycle.

The cable lock 610 has a first end that is releasably securable to and extendable from the security device 600 and a second end that is retained in/to the security device 600. This arrangement allows the first end of the cable lock 610 to be disengaged, or otherwise removed, from the security device 600, then passed around, or through, an object and then reengaged and secured to the security device 600. With the second end retained within, and the first end secured about/through the object and to security device 600, the security device 600 and the attached bicycle are secured to the object.

In some embodiments, the shackle 620 can be required to be in a closed position to allow the first end of the cable lock 610 to be secured to the security device 610 (once it is secured around an object, such as a bike rack). The security device 600 can be positioned on a bicycle similar to security device 110 of FIG. 1. In this position, the shackle 620 of the security device 600 can be passed through wheel of the bicycle and secured, which prevents/limits the ability of the wheel to rotate.

The shackle 620 can be extended from, or retracted into, the housing 602 of the security device 600 by actuating the tab 622. The tab 622 is linked to, or integrated with, the shackle 620 and can be moved about a groove 604 within the housing 602. A user can move the tab 622 about the groove 604 to cause the shackle 620 to rotatably move out of the housing (and back into the housing). To allow rotation of the bicycle wheel, the shackle 620 can be retracted, at least partially, into the housing 602. In this configuration, the shackle 620 does not impede the rotation of the bicycle wheel. To secure the bicycle wheel, the shackle 620 can be extended, or rotated, so that a first end of the shackle 620 passes about the bicycle wheel and back into the housing 602. The first end of the shackle 620 can then be secured within the housing 602 to prevent unauthorized, or unwanted, movement of the shackle 620. In the extended configuration, the shackle 620 impedes the ability of the bicycle wheel to rotate and assists in preventing movement of the bicycle, such as by unauthorized/unwanted use, theft, and/or other movement.

Thus, as depicted, the integrated security device 600 includes both a cable lock (or tether), extendable out of the housing of the lock to secure a bicycle to an object, as well as a shackle that rotates to prevent a back wheel of the bicycle 100 from rotating freely. In some embodiment, the security device 600, as described herein, prevents the cable lock from securely attaching to the housing of the device 600 unless the shackle has been rotated into a locked position. Further, in some cases, the security device 600 disengages the cable lock from the housing of the device 600 when the shackle 620 has been retracted into the housing to its open, or unlocked position.

In some embodiment, the cable or tether of the 610 is configured to provide a suitable length for attaching to objects when in use, while also fitting within a housing of the security device, or lock, when not in use (e.g., when retracted into the device 600). Such security devices 600 are designed to be large enough to secure a rear wheel of a bicycle, but small enough to be fixed to the bicycle near the rear wheel. Thus, in some embodiments, the cable or tether is housed to maximize the overall length of the cable while also fitting inside a small or narrow housing of the security device 600.

For example, a standard size security device 600 can have an inner dimension of 7.8 cm, in order to accommodate a standard size wheel and tire, while an oversized security device 600 can have an inner dimension of 12.2 cm, to accommodate larger wheels and tires (e.g., fat tires).

As described herein, the cable or tether 610 have varying lengths, depending on a size of a housing configured to house the cable 610. In some cases, such as for standard size locks, the cable 610 can be up to 17 inches in length (e.g., between 15-17 inches), whereas for oversized locks the cable 610 can be up to 25 inches in length. Further, the cable 610 can have a diameter of about ⅛ inch to ½, inch, depending on the size of the housing containing the cable 610 and the design of the cable 610.

Figure 7A:
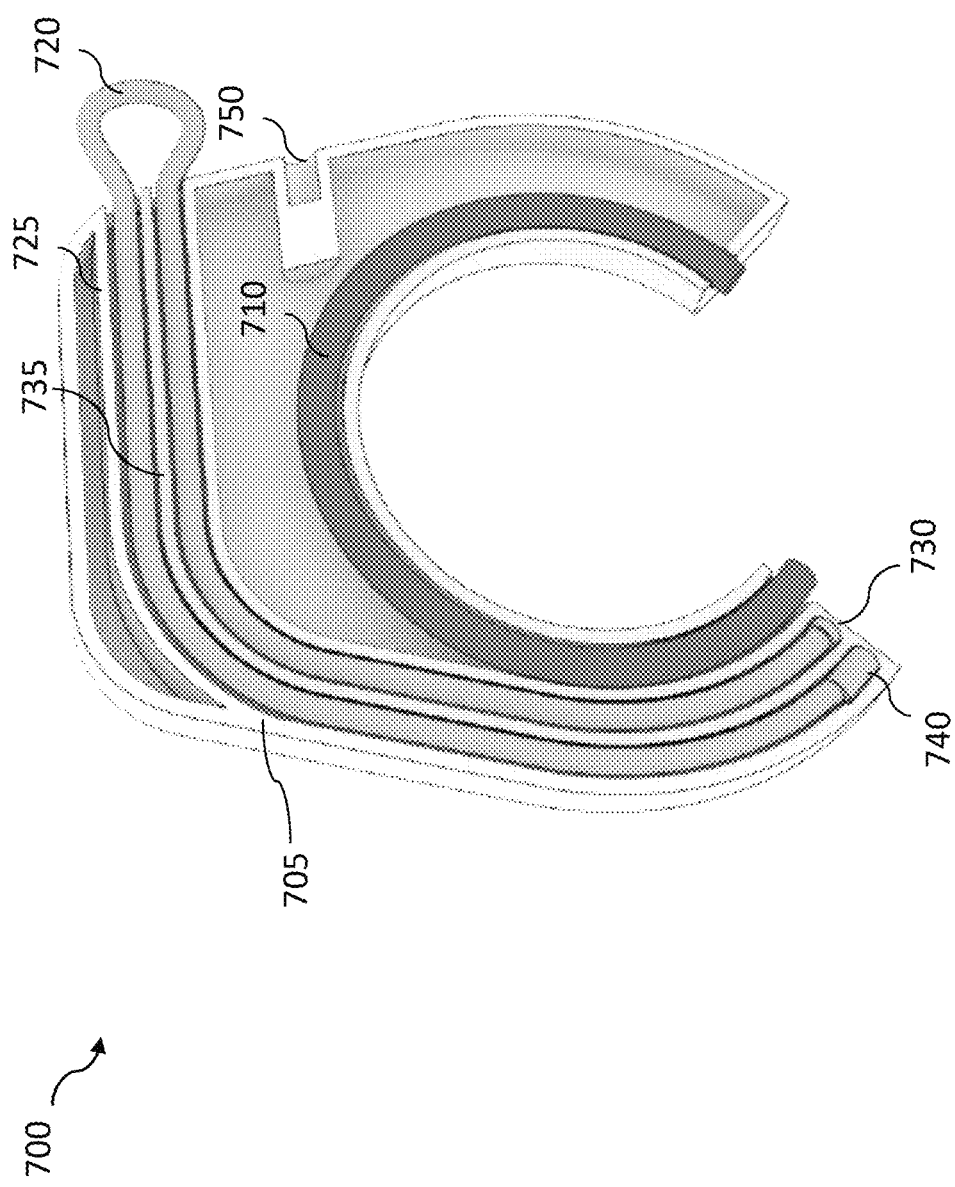
FIGS. 7A-7B illustrate an integrated bicycle lock having a foldable tether component.
Figure 7B:
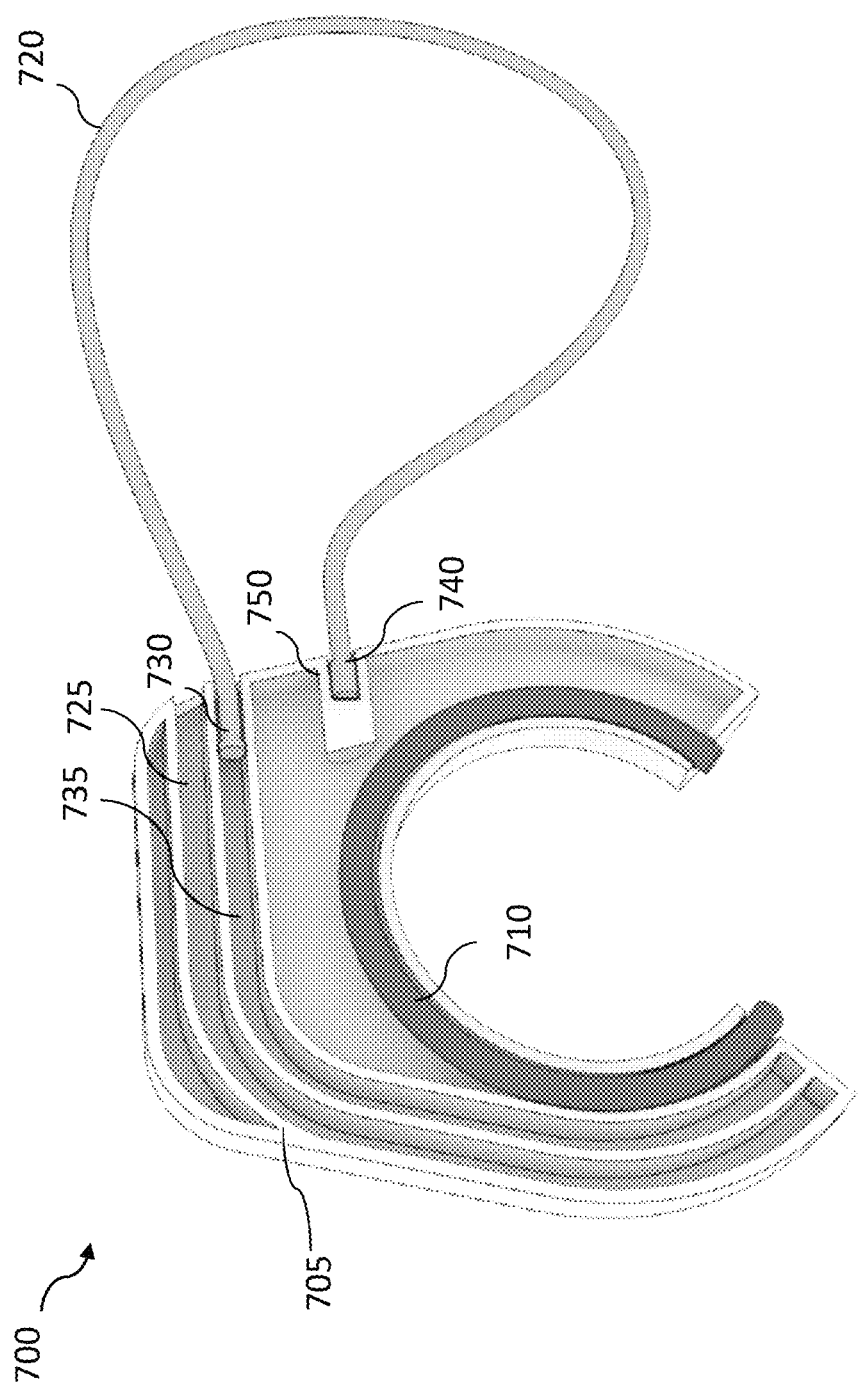

FIGS. 7A-7B illustrate an integrated bicycle lock 700 having a foldable tether or cable 720 and a shackle 710. FIG. 7A depicts the bicycle lock 700 in an unlocked configuration. The lock 700 includes a housing 705 having multiple channels (or guides) 725, 735, each of which are sized to contain a portion of the cable or tether 720 within the housing 705, while facilitating the cable 720 to traverse through the housing 720 in a folded or wrapped configuration.

The cable has two ends, a first end 730 that remains within the housing 705, and a second end 740 that extends, out of the housing 705, when the cable 720 is being used to fix a bicycle to an object. However, when not in use, the second end 740 enters the housing 705 via the channel 725 and is pushed into place to be stored within the lock 700. Similarly, the first end 730 (and cable) is pushed via the channel 735 into the lock 700.

As depicted in FIG. 7B, the cable 720 can be removed from the housing 705 by first pulling the second end 740 of the cable 720 out of the housing 705 via the channel 725, and then extending the cable away from the lock, which causes the first end 730 of the cable 720 to travel through the channel 735 and stop at an opposite end of the housing 705. The cable 720 is then wrapped around an object, such as a bike rack, pole, another bike, and so on, and the second end 740 of the cable 720 fixed to the housing 705 at a lock point 750. The lock point 750, located on an outer surface of the housing, can be configured to receive the second end 740 of the cable 720 and securely fix the cable 720 to the housing 705.

As described herein, the lock 700 may, in some cases, enable the second end 740 of the cable 720 to be secured to the housing 705 via lock point 750 when the shackle 710 is in a closed or locked position (preventing movement of the wheel, as described herein). However, as shown in FIG. 7B, in some cases the cable 720 is secured to the housing 705 independent of the position of the shackle 710.

Once unlocked, the cable 720 can retract (or be pushed) back into the housing 705 via the guides or channels. For example, the first end 730 of the cable 720, which secures the cable to the housing 705, moves through the channel 735 to a closed or unlocked position when not in use. The cable 720 is then folded, and the second end 740 is pushed into and through the channel 725 to its closed or unlocked position. Thus, the housing 705 is configured to store a cable or tether that has a suitable length (e.g., 17 inches, folded into 8½ inch long sections within the housing 705) for securing the bicycle to objects.

Figure 8A:
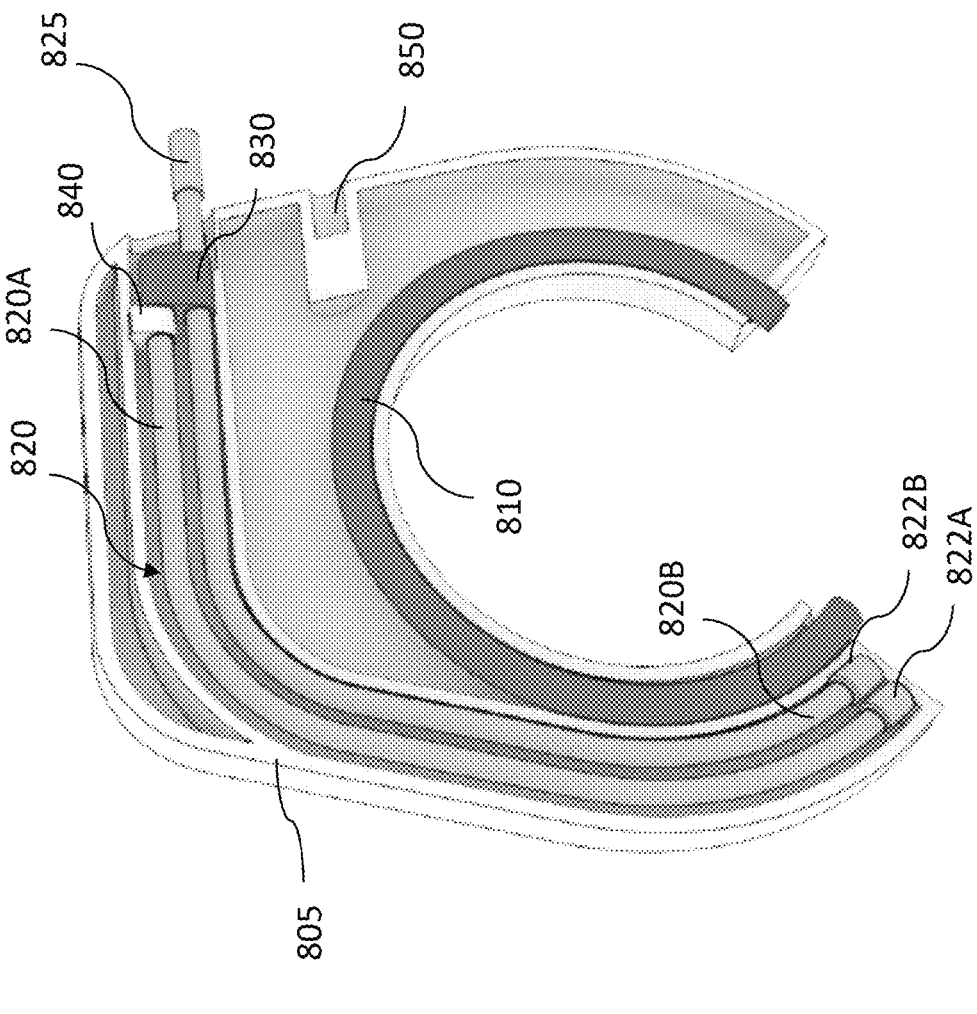
FIGS. 8A-8B illustrate an integrated bicycle lock having an expandable tether component.
Figure 8B:
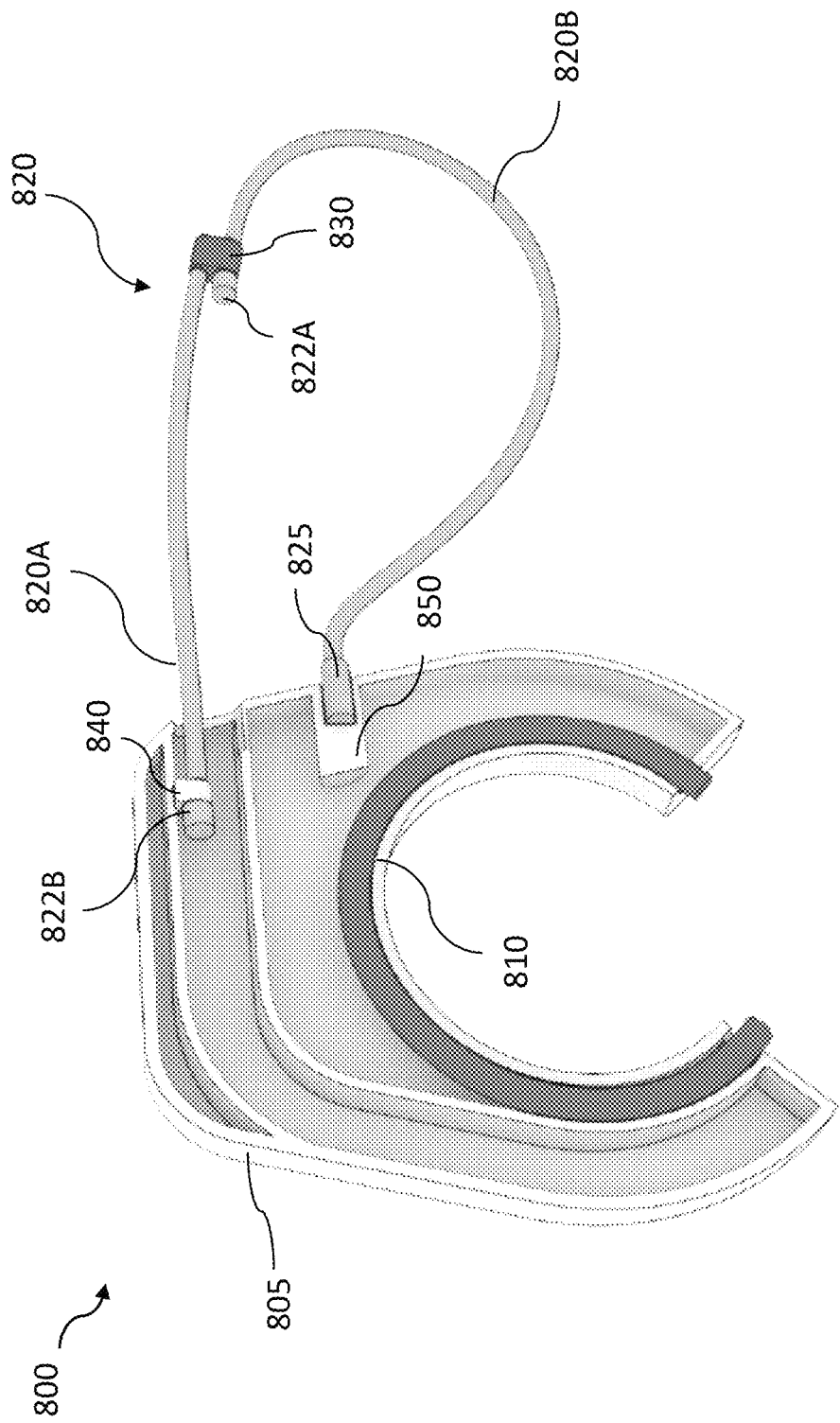

In addition to the folding cable or tether, the security devices described herein can utilize other cable or tether configurations. FIGS. 8A-8B illustrate an integrated bicycle lock 800 having an expandable tether component 820 and a shackle 810. FIG. 8A depicts the bicycle lock 800 in an unlocked configuration. The lock 800 includes a housing 805 having a single cavity or channel that houses the expandable cable or tether 820.

The expandable cable 820 includes a first cable portion 820A and a second cable portion 820B. The first cable portion 820A is fixed to the housing 805 via a stop 840, which prevents the cable 820 from being removed or unattached from the housing 805. The second cable portion 820B is attached to the first cable portion 820A via a block 830, such as a block made of steel. The block 830 securely attaches to one end of the first cable portion 820A, but allows the second cable portion 820B to slide, when extended, through an opening in the block 830.

Thus, when not in use, the expandable cable 820 is disposed within the housing 805, with one end of the cable (e.g., end 825 of the second cable portion 820B) partially outside of the housing 805. As depicted, each cable portion 820A and 820B include second ends 822A and 822B, respectively, which, when the cable 820 is within the housing 805, sit proximate to one another.

However, as depicted in FIG. 8B, when the cable 820 is extended out of the housing 805 to fix a bicycle to an object, the two second ends 822A and 822B of the two portions 820A and 820B of the cable 820 move through the housing 805. The second end 822A of the first cable portion 820A stops (or is stopped) by the stop 840, fixing or otherwise securing the cable 820 to the housing 820.

The other end of the first cable portion 820A, attached to the block 830, extends out of the housing, along with the block 830. Further, the second cable portion 820B slides through the opening of the block 830 (such as when the end 825 is pulled away from the housing 805) and stop when the second end 822B meets the block 830 (preventing the second cable portion 820B from sliding further). Thus, the cable is in an expanded configuration, and can wrap around an object, such as a bike rack, pole, another bike, and so on, and the second end 825 of the cable 820 fixes to the housing 805 at a lock point 850 or other cable attachment point.

Once unlocked (as described here, via the shackle 810 being unlocked or another mechanism), the cable 820 moves back into the housing 805 into a retracted configuration, where the two cable portions 820A and 820B are disposed proximate to one another within the housing 805.

Thus, the housing 805 is configured to store a cable or tether that has a suitable length (e.g., 17 inches, including 8½ inch long cable portions 820A and 820B within the housing 805) for securing the bicycle to objects. In some cases, such as for oversized locks, the cable can include 3 or more cable portions, such that the cable is ~25 inches in length or longer, depending on whether a size of the housing is configured to accommodate the different cable portions (and associated blocks).

In addition to the configurations described herein, the cable can expand or extend in other ways. For example, the cable can include a telescopic portion, where a solid portion of a cable is disposed within a hollow outer cable. To extend the cable, the outer portion can extend out of the housing, pulling the inner portion partially out of the housing until it is stopped within the housing. Thus, one end of the inner portion is fixed in the housing, one end of the outer portion is configured to be secured to a lock point of the housing, and the two portions are disposed such that the expand and retract in a telescopic manner.

Thus, in some embodiments, a single lock or security device can be configured to include two security mechanisms or locking mechanisms, a shackle or wheel lock and a cable or tether lock. The shackle or wheel lock, made from solid, hardened steel, can be used to prevent movement of the wheels of the bike, while the cable or tether, made from a polymer-coated, braided steel cable, acts to secure the bike to objects at a location.

The cable can be formed of other materials, such as nylon with steel reinforcement or Kevlar materials. Further, the cable (and various portions) can include an outer coating, such as Teflon, that provides a slippery or reduced friction surface, which allows various cable portions to move and/or slide with respect to one another.

Thus, the lock, without compromising its size or composition, provides two security mechanisms, giving a potential thief a more robust security device to break when attempting to steal a bicycle, among other benefits.

Example Theft Alert Trigger Processes

As described herein, in some embodiment, the security device, or lock, can include components configured to trigger an alert about a possible theft or unauthorized use of a bicycle. For example, a security system configured to alert a user of a bicycle, as described herein, can utilize information received from the lock or security device when determining whether to send an alert or alarm. The information can include information indicating a specific component has been damaged or tampered with, such as a shackle, cable, tether, or key lock mechanism.

Figure 9:
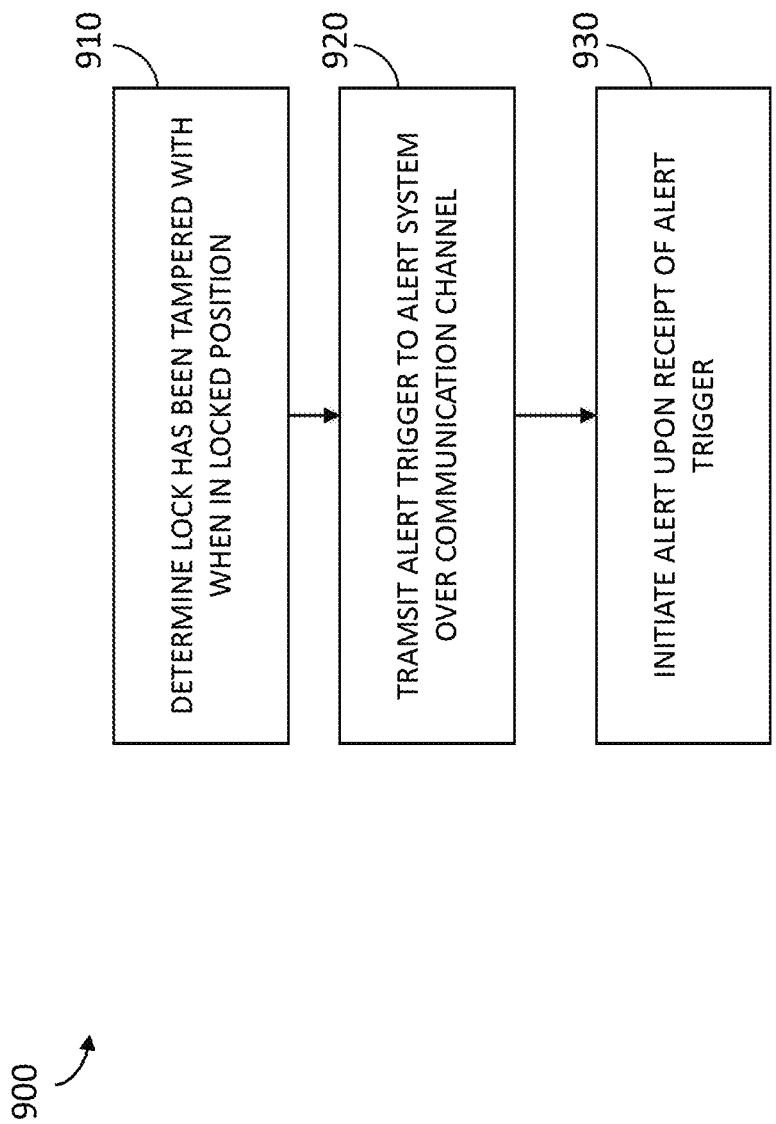
FIG. 9 is a flow diagram illustrating an example method of generating a theft alarm via a bicycle security device.

FIG. 9 is a flow diagram illustrating an example method 900 of generating a theft alarm via a bicycle security device. The method 900 may be performed by the security system 300 and, accordingly, is described herein merely by way of reference thereto. It will be appreciated that the method 900 may be performed on any suitable hardware.

In operation 910, the security system 300 receives a tamper indication from a security device of a bicycle. For example, the system 300, which may be part of the security device 600, 700, or 800, or attached to the security device (such as an integrated module), receives an indication that a component of the device has been damaged or tampered with.

The indication can be based on various components being damaged or tampered with, such as an indication that a cable or tether has been cut or has been pulled out of a locking mechanism, that a shackle has been cut or damaged, that the housing has been cut or punctured, that security screws have been tampered with, and so on. The lock can include various sensors to detect such events, including sensors that determine the cable has been cut or the housing has been damaged.

For example, when a cable lock wraps around an object and is secured to the housing, it can form a complete electrical circuit. Damage or cutting of the cable can cause a break in the circuit, triggering an indication of damage to the lock. Thus, the lock can include a continuity tester or sensor that determines, when a lock is secured in a lock position, the lack of a complete circuit.

In operation 920, the security system 300 transmits an alert trigger to an alert system over a communication channel. For example, the security device 180 can transmit the alert trigger to the controller 175 of the bicycle over Bluetooth. The device 180 can send the trigger along with other triggers or alerts, as described herein, such as alerts associated with a movement of the bicycle 100 and/or a location of the bicycle 100.

In operation 930, the security system 300 initiates an alert based on the trigger (or triggers) received from the security device. For example, the alert system can determine, based on information received from the security device, that a bicycle is being stolen, and alert a user of the potential theft. The system 300 can determine the possible theft based on the trigger from the lock and/or multiple triggers, including a lock-based trigger.

In some cases, by utilizing information associated with events at the security device or lock, the system can mitigate generating and sending false alerts or alarms associated with seemingly abnormal movement of a bicycle. For example, a bike can be moved near a rack by another rider seeking space (or can be accidentally knocked down) and could trigger an alarm solely based on movement of the bicycle. However, an alert system that determines a bike is being stolen based on lock-based events, or multiple triggers including a lock-based trigger, can provide safe and secure monitoring of a bicycle without sending false alarms to owners, among other benefits.

Example Embodiments of the Security Devices and Systems

In some embodiments, the security device includes a housing, a wheel having a shackle that is at least partially disposed within the housing and configured to slidably rotate into a locked position, where the locked position of the shackle prevents a rear wheel of the bicycle from rotating, and a cable lock at least partially disposed within the housing and configured to extend outwards from the housing and securely attach to the housing at a lock point when in a locked position, where the locked position of the cable lock fixes the bicycle to an object at a location that includes the bicycle.

In some cases, the cable lock can be a single cable that is folded and disposed within channels of the housing when the cable lock is in an unlocked position. In some cased, the cable lock can be an expandable cable having at least two separate cable portions that slidably move with respect to one another via a block that fixes the cable portions to one another.

The cable lock can be configured to be in an expanded configuration when the cable lock extends outwards from the housing in the locked position and configured to be in a contracted position when the cable lock is disposed within the housing in an unlocked position.

The lock point locks the cable to the housing when the shackle has been slidably rotated into the locked position of the shackle, and the housing can include a stop that fixes one end of the cable lock to the housing. The shackle can be made of solid, reinforced steel, and the cable lock is made of a polymer coated, braided steel, and length of the cable lock in the locked position is about 17 inches.

In some embodiments, a bicycle lock includes a housing, a wheel lock, and a cable lock. The cable lock can include a cable having a first end that extends out of the housing when the cable is in a locking position and a second end that fixes the cable to an inner portion of the housing when the cable is in the locking position.

In some cases, the cable lock is an expandable cable having two cable sections that slide relative to one another when the cable is extended out of the housing in the locking position. A first cable section is at least partially disposed within the housing when the expandable cable is extended out of the housing, having a first end that attaches to a block and a second end that retains the first cable section to the housing. A second cable section is disposed outside of the housing when the expandable cable is extended out of the housing, and has a first end that secures the expandable cable to a lock point disposed on the housing and a second end that slidably connects to first cable section via an opening in the block.

In some cases, the expandable cable has at least two cable sections that slide relative to one another when the cable is extended out of the housing in the locking position.

In some cases, the cable lock is a single cable configured to fold into multiple channels within the housing when retracted into the housing.

The housing can include an outer surface of the housing that has a lock point that securely receives the first end of the cable to lock the cable to the housing in a locked position.

In some embodiments, the bicycle security system sends an alert about an electric bicycle by receiving an indication from a lock-based security device of an abnormal event at a lock of the electric bicycle, determining a potential unauthorized use of the electric bicycle based on the abnormal event at the lock of the electric bicycle, and transmitting an alert to an owner of the electric bicycle based on the determination of the potential unauthorized use of the electric bicycle.

In some cases, the system receives an additional indication of an abnormal movement of the electric bicycle and determines the potential unauthorized use of the electric bicycle based on the abnormal event at the lock of the electric bicycle and the abnormal movement of the electric bicycle. The abnormal event at a lock of the electric bicycle can include a determination that a cable lock has been damaged, a shackle lock has been damaged, and/or a housing of the lock has been damaged.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the electric bike and bike frame may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. A security device for a bicycle, the security device comprising:
    a housing having multiple channels;
    a wheel lock having a shackle that is at least partially disposed within the housing and configured to slidably rotate into a locked position,
        wherein the locked position of the shackle prevents a rear wheel of the bicycle from rotating; and
    a cable lock configured to extend outwards from the housing and securely attach to the housing at a lock point when in a locked position that fixes the bicycle to an object at a location that includes the bicycle,
        wherein the cable lock is configured to fit within the multiple channels of the housing in a folded configuration when the cable lock is in an unlocked position.

2. The security device of claim 1, wherein the cable lock is configured to be in an expanded configuration when the cable lock extends outwards from the housing in the locked position and configured to be in a contracted position when the cable lock is disposed within the housing in the unlocked position.

3. The security device of claim 1, wherein the lock point locks the cable to the housing only when the shackle has been slidably rotated into the locked position of the shackle.

4. The security device of claim 1, wherein the housing includes a stop that fixes one end of the cable lock to the housing.

5. The security device of claim 1, further comprising:
    a communication system configured to send information to an alert system of the bicycle when detecting the cable lock or the wheel lock have been damaged.

6. The security device of claim 1, wherein the shackle is made of solid, reinforced steel, and the cable lock is made of a polymer coated, braided steel.

7. The security device of claim 1, wherein a length of the cable lock in the locked position is between 15 and 17 inches in length.

8. A bicycle lock, comprising:
    a housing;
    a wheel lock having a shackle; and
    a cable lock disposed within the housing in a folded configuration,
        wherein the cable lock includes an expandable cable having a first end that extends out of the housing when the cable is in a locking position and a second end that fixes the cable to an inner portion of the housing when the cable is in the locking position, and
        wherein the expandable cable includes:
            at least two separate cable portions that slidably move with respect to one another; and
            a block that fixes the cable portions to one another and moves out of the housing when the expandable cable is in the locking position.

9. The bicycle lock of claim 8, wherein the
    a first cable section at least partially disposed within the housing when the expandable cable is extended out of the housing,
        wherein the first cable section has a first end that attaches to the block and a second end that retains the first cable section to the housing; and
    a second cable section disposed outside of the housing when the expandable cable is extended out of the housing,
        wherein the second cable section has a first end that secures the expandable cable to a lock point disposed on the housing and a second end that slidably connects to first cable section via an opening in the block.

10. The bicycle lock of claim 8, wherein an outer surface of the housing includes a lock point that securely receives the first end of the cable to lock the cable to the housing in a locked position.

* * * * *